W. G. DEANE.
TIRE CASING CONSTRUCTION.
APPLICATION FILED JAN. 28, 1919.
1,299,305.
Patented Apr. 1, 1919.
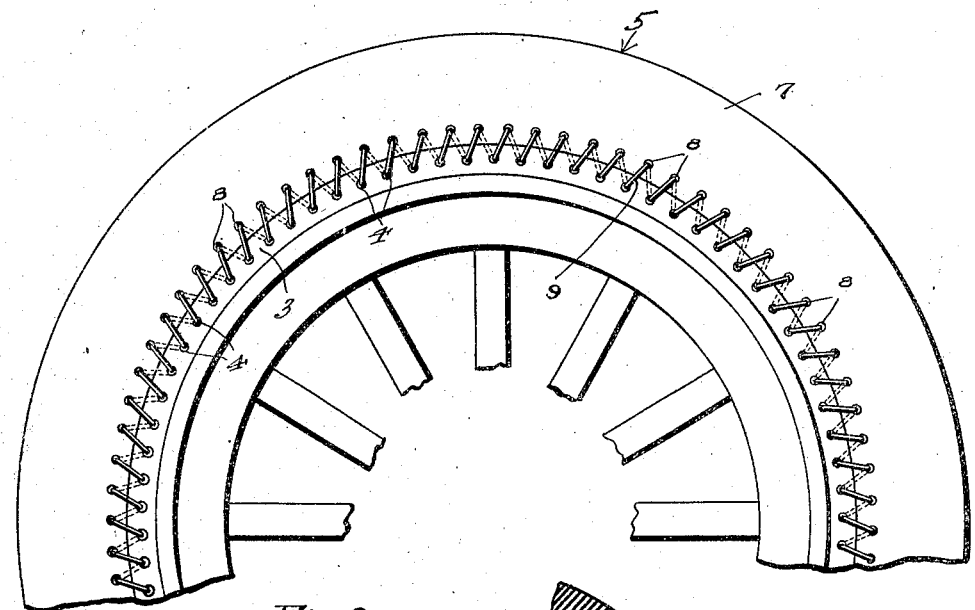
Fig. 2.
Fig. 1
Fig. 3.
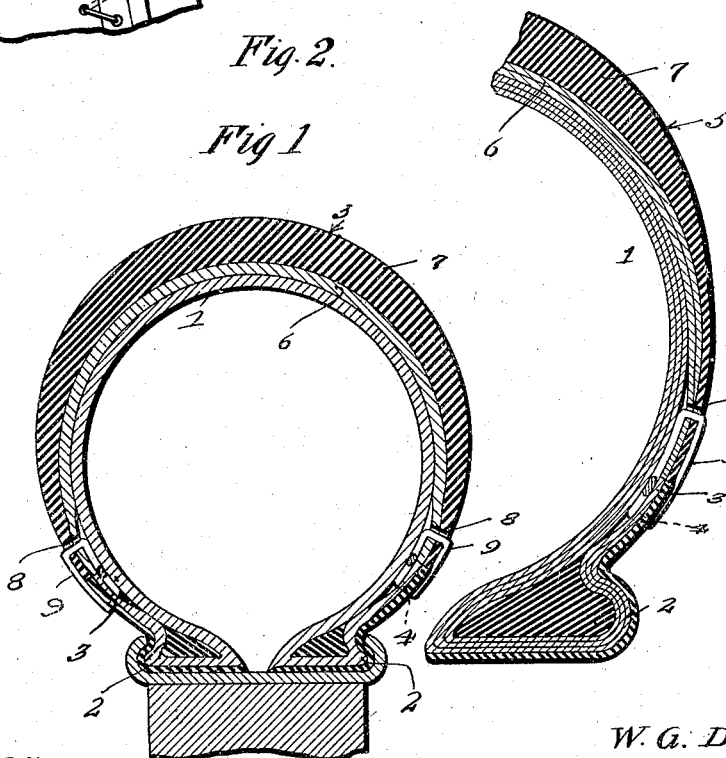
Witnesses
K. A. Thomas
J. E. Turf
Inventor
W. G. Deane
By Victor J. Evans
Attorney

UNITED STATES PATENT OFFICE.

WILLIAM G. DEANE, OF NIAGARA FALLS, NEW YORK.

TIRE-CASING CONSTRUCTION.

1,299,305.	Specification of Letters Patent.	Patented Apr. 1, 1919.

Application filed January 28, 1919. Serial No. 273,520.

*To all whom it may concern:*

Be it known that I, WILLIAM G. DEANE, a citizen of the United States, residing at Niagara Falls, in the county of Niagara and State of New York, have invented new and useful Improvements in Tire-Casing Construction, of which the following is a specification.

My present invention pertains to the casings of pneumatic tires; and it has for its general object to provide a tire casing construction that is simple and inexpensive and is adapted to permit of a tread member being expeditiously and easily removed and as readily replaced with a new tread member.

The invention in all of its details will be fully understood from the following description and claims, when the same are read in connection with the drawings, accompanying and forming part of this specification, in which:—

Figure 1 is a transverse section of a tire casing embodying the best practical construction of which I am aware.

Fig. 2 is a fragmentary side elevation of the casing constructed in accordance with my invention.

Fig. 3 is an enlarged transverse section showing the manner in which the side flaps of the casing are laced to the tread member.

Similar numerals of reference designate corresponding parts in all of the views of the drawings.

In furtherance of my invention I provide a casing body 1 which may be and preferably is formed of the material or materials common in the art. The said casing is equipped with the usual marginal clencher portions 2, and is further provided with side flaps 3. These side flaps 3 reach outwardly from the clencher portions and are provided at intervals in their length and at points adjacent to their free edges with apertures 4.

Arranged against the tread portion of the casing body and interposed between the free edges of the flap portions 3 and abutting at its longitudinal edges against the free edges of the flaps 3 is a tread member 5. The said tread member 5 is preferably, although not necessarily, formed of an inner layer of textile fabric, indicated by 6, and an outer layer 7, of rubber or some composition analogous to rubber. Adjacent to its longitudinal edges the tread member 5 is provided with a plurality of transverse apertures 8. These apertures 8 are adapted to serve in conjunction with the apertures in the side flaps 3 for the reception of laces 9, which are preferably of rawhide, though they may be of any other material compatible with the purpose of my invention without involving departure from the same as defined in the appended claims.

It will be apparent from the foregoing that my novel tire casing construction is adapted for embodiment in new casings, and is also adapted to be used to advantage in the economic and thorough repair of all casings, and this in such manner that the usefulness of a casing may be prolonged for an indefinite period. This latter will be fully appreciated when it is stated that after one of the tread members 5 becomes worn it may be quickly and easily removed from the casing body and a new tread member put in its place and quickly and easily connected through the medium of the laces with the side flaps 3.

The materials of which the several elements that enter into my improved casing construction are made is not of the essence of my invention and hence it follows that without affecting the invention the said elements may be of any material or materials suitable to their purpose. I will also have it understood that while I prefer to provide the casing body with clencher portions on its longitudinal edges as shown and described, I do not desire to be understood as confining myself to such provision inasmuch as the edges of the casing body may be connected with a rim in any approved manner without affecting my invention as claimed.

An important characteristic of my invention resides in the fact that the tread member 5 is interposed between the free edges of the side flaps 3. By virtue of this, the edges of the side flaps abutting against the opposed edges of the tread member, serve effectually in precluding lateral shifting or displacement of the tread member and in that way remove a very large proportion of the strain from the laces.

It will further be appreciated from the foregoing that my novel tire casing construction is simple and compact, and is quite as neat in appearance as in ordinary tire casing construction. Also that in the practical use of the improved tire casing construction, the removal of the tread member and the placing and securing of a new tread member does not entail the employment of skilled labor or tools of any description which is an important desideratum.

Having described my invention what I claim and desire to secure by Letters-Patent is:—

1. The herein described tire casing construction consisting essentially of a casing body having clencher portions along its marginal edges and also having apertured side flaps reaching outwardly from the said clencher portions, an apertured tread member opposed to the outer portion of the casing body and interposed between the free edges of the side flaps and abutting at its edges against said free edges of the side flaps, and laces passed through the apertures of the side flaps and the apertures of the tread member and connecting the same together in proper relation.

2. In a tire casing construction, the combination of a casing body, side flaps carried by the marginal portions of the casing body and having apertures at intervals in their length and adjacent to their free edges, a tread member bearing against the bight of the casing body and interposed between and abutting against the free edges of the side flaps and having apertures adjacent to its edges and at intervals in its length, and laces passed through the apertures of the side flaps and tread member and connecting the same together.

3. In a tire casing construction, a casing body having side flaps on its marginal portions which flaps are provided with means whereby a tread member may be connected thereto.

4. In a tire casing construction, the combination of a casing body, side flaps carried by the marginal portions of the casing body, a tread member bearing against the bight of the casing body, and means detachably connecting the said tread member with said side flaps.

In testimony whereof I affix my signature.

WILLIAM G. DEANE.

Copies of this patent may be obtained for five cents each, by addressing the "Commissioner of Patents, Washington, D. C."